April 6, 1965 J. L. TORRICO 3,177,311

PIVOTALLY ACTUATED ALTERNATE ACTION SWITCH

Filed May 21, 1962 2 Sheets-Sheet 1

INVENTOR.
JORGE L. TORRICO

BY
Dunlap, Laney & Hubbard
ATTORNEYS

April 6, 1965 J. L. TORRICO 3,177,311
PIVOTALLY ACTUATED ALTERNATE ACTION SWITCH
Filed May 21, 1962 2 Sheets-Sheet 2
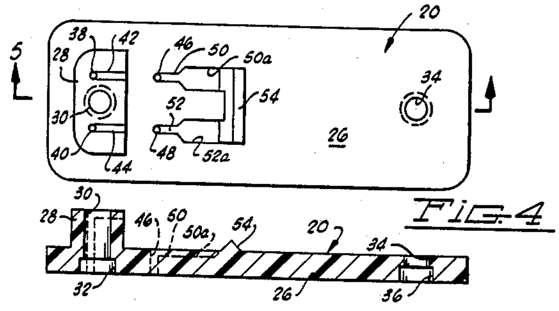
FIG. 4
FIG. 5
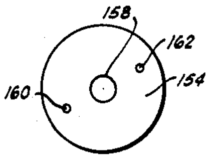
FIG. 10
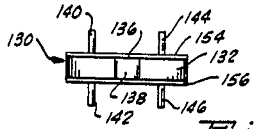
FIG. 11
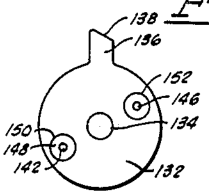
FIG. 12
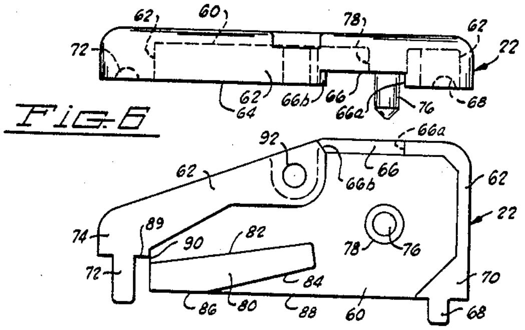
FIG. 6, FIG. 7
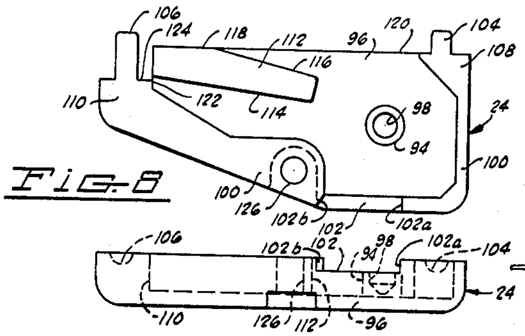
FIG. 8, FIG. 9
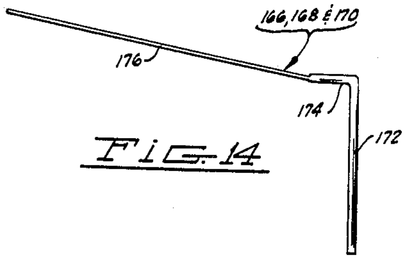
FIG. 14
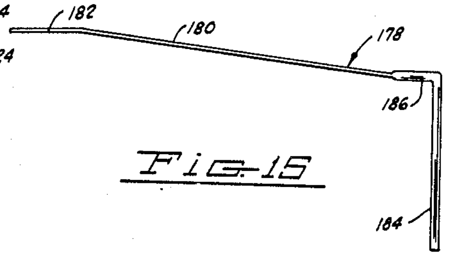
FIG. 15
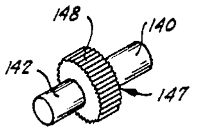
FIG. 13
INVENTOR.
JORGE L. TORRICO
BY
Dunlap, Laney & Hubbard
ATTORNEYS United States Patent Office 3,177,311

Patented Apr. 6, 1965

3,177,311
PIVOTALLY ACTUATED ALTERNATE ACTION SWITCH

Jorge L. Torrico, Noble, Okla., assignor, by mesne assignments, to Progressive Electronics, Inc., Oklahoma City, Okla.

Filed May 21, 1962, Ser. No. 196,255
7 Claims. (Cl. 200—47)

The present invention relates to electrical switches and more particularly, but not by way of limitation, relates to microswitches of the type which are spring biased to one of two positions and which are particularly adapted to automatically control the operation of an electro-mechanical device.

In co-pending application entitled "Sound Reproducing Device Having a Replaceable Endless Tape Cartridge," Serial No. 149,417, filed November 1, 1961, and assigned to the assignee of the present application, a sound reproducing device is described which utilizes an endless magnetic tape, the tape being pulled across a pickup head by a drive capstan. After the endless tape has played through one time, a slot in the tape actuates a microswitch to stop operation of the device. The device may again be started by momentarily completing a circuit to the capstan drive motor to move the slot in the tape past the microswitch. Then the tape will maintain the microswitch closed until the tape has again played through and the slot opens the microswitch. In order for the recording device to function properly, the microswitch must be highly sensitive and quick acting. In other words, the microswitch must be very sensitive in order for the relatively light pressure exerted by the endless tape to continuously hold the microswitch closed; and, the microswitch must almost instantaneously open to stop the movement of the tape as the slot passes. When the endless tape is running, the microswitch must be closed to complete two circuits, one to the motor driving the capstan and the other to the amplifier circuit. When the microswitch opens by springing into the slot in the tape, it has been found that the momentum of the drive motor will frequently carry the slot past the microswitch unless a dynamic braking circuit is utilized to arrest the momentum of the motor. Therefore a dynamic braking circuit must be completed by the microswitch as it opens into the slot to brake the momentum of the motor. Thus it will be evident that the microswitch for the audio device must have a multiplicity of contacts in order to open and close the various circuits.

Accordingly, it is contemplated by the present invention to provide a highly sensitive switch readily adaptable to miniaturization which may be provided with a multiplicity of contacts. The switch comprises, in general, a support, a switch member pivotally connected to the support for movement between at least two positions, a conductive spring contact member connected to the support and engaging the switch member for biasing the switch member to one of the positions, and a second conductive contact member connected to the support for completing an electrical circuit when the switch is in one of the positions. More specific aspects of the present invention include a novel switch member having a plurality of uniquely arranged contact surfaces thereon, a plurality of contact members connected to the support for engaging the contact surfaces to complete electrical circuits when the switch member is in one of the plurality of positions, and a novel support housing which may be economically manufactured and permits relatively easy and economical assembly.

Therefore it is an important object of the present invention to provide a highly sensitive microswitch which is held in the actuated position by a minimum pressure.

Another object of the present invention is to provide a microswitch having a very quick response upon release of an actuating pressure.

Another very important object of the present invention is to provide a microswitch having a plurality of contacts for completing a plurality of circuits.

Yet another object of the present invention is to provide a microswitch of the type described which is particularly adapted for use in combination with a printed circuit board.

Another object of the present invention is to provide a microswitch of the type described which has an exceedingly long operating life.

Still another object of this invention is to provide a microswitch which can be economically manufactured on a mass production basis.

Yet another object of the present invention is to provide a microswitch of the type described which is totally enclosed except for a protruding actuating arm.

Another object of the present invention is to provide a microswitch of the type described which is highly reliable in operation.

Many additional objects and advantages of the present invention will be evident to those skilled in the art from the following detailed description and drawings, wherein:

FIG. 4 is a plan view of the support housing base plate of the microswitch of FIG. 1;

FIG. 5 is a sectional view taken substantially on lines 5—5 of FIG. 4;

FIG. 6 is a top view of one of the support housing side members;

FIG. 7 is a side view of the interior of the support housing side member shown in FIG. 6;

FIG. 8 is a side view of the interior of the other support housing side member of the microswitch shown in FIG. 1;

FIG. 9 is a top view of the support housing side member shown in FIG. 8;

FIG. 10 is a side view of an insulating disk forming a part of the switch member of the microswitch of FIG. 1;

FIG. 11 is a top view of the switch member of the microswitch of FIG. 1;

FIG. 12 is a side view of the switch member shown in FIG. 11 with the insulating disk shown in FIG. 10 removed therefrom;

FIG. 13 is a perspective view of a portion of the switch member shown in FIGS. 11 and 12;

FIG. 14 is a side view of one of the conductive contact members used in the microswitch of FIG. 1; and, FIG. 15 is a side view of a conductive spring contact member used in the microswitch of FIG. 1.

Figure 1:
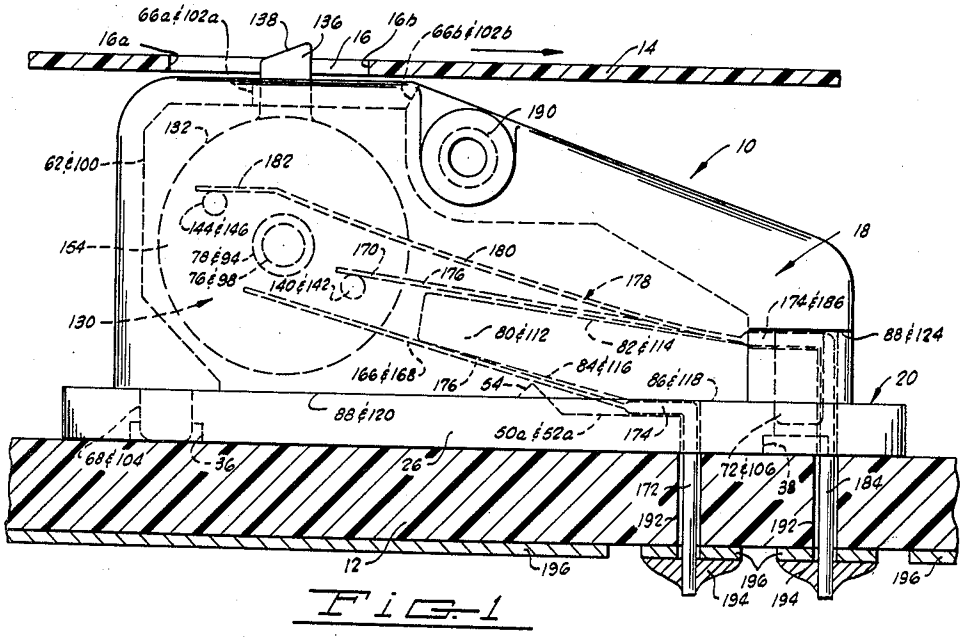
FIG. 1 is a side elevation of a microswitch constructed in accordance with the present invention with the interior components of the switch shown in dotted outline.

Referring now to the drawings, and in particular to FIG. 1, a microswitch constructed in accordance with the present invention is indicated generally by the reference numeral 10. The microswitch 10 is shown mounted on a printed circuit board 12 with a magnetic tape 14 having an actuating slot 16 positioned to actuate the microswitch as hereafter described in greater detail. The actuating slot 16 has a trailing edge 16*a* and a leading edge 16*b*.

The microswitch 10 has a support housing indicated generally by the reference numeral 18 which is comprised of a housing base plate member 20 and two housing side members 22 and 24, as shown in FIGS. 4 and 5, FIGS. 6 and 7, and FIGS. 8 and 9, respectively. The base plate member 20 and side members 22 and 24 are fabricated from an electrically nonconductive material and may conveniently be molded from a suitable nonconductive synthetic resin or other plastic.

The base plate member 20 comprises generally an elongated flat base plate portion 26 having a pillow block portion 28 extending transversely across one end thereof. A bore 30 extends downwardly through the pillow block portion 28 and through the plate portion 26 to receive the split dowels of the side members 22 and 24 as hereafter described in greater detail. A counterbore 32 to the bore 30 is provided to receive a spot of glue to secure the split dowels in place. A second bore 34 is provided at the opposite end of the base plate portion 26 to receive another set of split dowels. A counterbore 36 to the bore 34 is also provided to receive a spot of glue. It will be noted that bores 30 and 34 are aligned substantially along the center line or longitudinal axis of the base plate portion 26. Additional bores 38 and 40 pass through the pillow block portion 28 on opposite sides of the bore 30 and are intersected by parallel channels 42 and 44, respectively, in the top surface of the pillow block portion 28. It will be noted that the channels 42 and 44 extend generally parallel to the longitudinal axis of the base plate portion 26. Two more bores 46 and 48 pass through the base plate portion 26 on opposite sides of the center line extending between the bores 30 and 34 and are intercepted by grooves 50 and 52, respectively, in the upper face of the base plate portion 26. The grooves 50 and 52 are aligned with the grooves 42 and 44, respectively, and have widened portions *50a* and *52a*, substantially as illustrated. A fulcrum block portion 54 extends transversely across the enlarged portions *50a* and *52a* of the grooves for biasing a pair of contact members upwardly as hereafter described in greater detail.

The housing side member 22 is comprised generally of a side plate 60 and peripheral flange portion 62 which extends substantially around three edges of the side plate 60. The peripheral flange 62 has a flat outer face 64, as best seen in FIG. 6, except for a recessed portion which forms a slot 66, having ends *66a* and *66b*, in the housing 18 as will hereafter be more apparent. A half-circular dowel pin 68 is connected to an enlarged portion 70 of the peripheral flange 62 and a similar but slightly longer half-circular dowel pin 72 is connected to the enlarged portion 74 at the other end of the peripheral flange portion 62. It will be noted that the enlarged portion 74 has a width corresponding to the width of the pillow block portion 28 of the base member 20. It will also be noted that the half-circular dowel pins 68 and 72 are so spaced as to be received in the bores 30 and 34 of the base member 20. A pivot axle 76 has an enlarged shoulder portion 78 which is connected to the center of the side plate portion 60.

A central spacer portion 80 is formed on the side plate portion 60 and has an upper surface 82 and a lower surface 84, both of which are generally straight and are directed to points below the axle 76 in such a manner that imaginary extensions of the surfaces will not meet before reaching the vicinity of the axle 76. The central spacer portion 80 also has a lower face 86 which is aligned with the lower edge 88 of the plate 60. It will further be noted that the upper face 82 of the central spacer portion 80 extends to a point slightly below the lower face 89 of the enlarged portion 74 so as to provide a slight gap 90 through which a conducting member may pass as hereafter described. An aperture 92 may be provided in the peripheral flange member 62 to receive a brad for interconnecting the side members as hereafter described.

The other housing side member 24 is a mirror image of the housing side member 22, except that a shoulder projection 94 having substantially the same diameter as the shoulder 78 extends from the side plate portion 96. The shoulder projection 94 has a well 98 therein for receiving the end of the axle 76 on the housing side member 22. The housing side member 24 also has a peripheral flange portion 100 extending around three sides thereof. A slot 102 having ends *102a* and *102b* is positioned to mate with the slot 66 and form a single slot 66–102 in the support housing 18. Half-circular dowel pins 104 and 106 are connected to enlarged portions 108 and 110 of the peripheral flange portion 100. A spacer portion 112 having upper and lower surfaces 114 and 116, respectively, is connected to the side plate 96. The spacer portion 112 also has a bottom portion 118 aligned with the lower edge 120 of the side plate 96. A space 122 is also provided between the upper edge 114 of the spacer portion 112 and the lower edge 124 of the enlarged portion 110 to accommodate a conductive contact member as hereafter described. An aperture 126 is also provided to receive a connecting brad.

Referring now to FIGS. 10–12, a switch member, indicated generally by the reference numeral 130, is comprised primarily of a conductive circular disk 132 having a central aperture 134 for receiving the pivot axle 76. The conductive disk 132 has a radially projecting actuating arm 136 which preferably has a diagonally cut end 138. The conductive disk 132 also has two conductive dowel members extending therethrough which are disposed in aligned relationship on opposite sides of the central aperture 134. The dowel members form conductive contact surfaces 140, 142, 144 and 146, which are cylindrical in shape and are preferably disposed parallel to the axis of the bore 134, or in other words, at right angles to the conductive disk 132. The contact surfaces, 140, 142, 144 and 146 are preferably gold-plated to increase the efficiency of the electrical contact with silver contact members hereafter described. Accordingly, the dowel member forming the contact surfaces 140 and 142, for example, may conveniently be molded in the shape shown in FIG. 13 as a single dowel member 147. The dowel member 147 is preferably formed with an enlarged center portion 148 having a plurality of projecting teeth therearound, substantially as illustrated. The enlarged portion 148 may then be press fitted into apertures 150 and 152 in the conductive disk 132 after the entire dowel member has been gold dipped. A pair of insulating disks 154 and 156 (disk 154 being illustrated in FIG. 10) may then be adhered to opposite sides of the conductive disk 132. It will be noted that the nonconductive disk 154 has a central aperture 158 for registration with the central aperture 134, and apertures 160 and 162 for receiving the respective contact projections 140 and 144, 142 and 146.

Referring now to FIG. 14, a conductive wire contact member is indicated generally by the reference numeral 166. Three identical wire contact members 166 are required in the assembled microswitch 10 and are hereafter designated by reference numerals 166, 168 and 170. The contact member 166 is comprised of a cylindrical lead wire portion 172 which is bent at 90° to form a stabilizing portion 174 and is flattened to provide a spring contact portion 176. The contact members 166, 168 and 170 are preferably fabricated from a silver wire so as to provide exceptionally good electrical contact with the gold-plated contact surfaces on the switch member 130. Another conductive spring contact member, indicated generally by the reference numeral 178, is substantially identical to the contact member 166 except that the flattened spring portion 180 is longer than the corresponding flattened spring portion 176, and preferably has a slightly downwardly bent portion 182. The spring contact member 178 also has a lead portion 184 and a stabilizing portion 186 bent at 90° to the lead portion 184.

Figure 2:
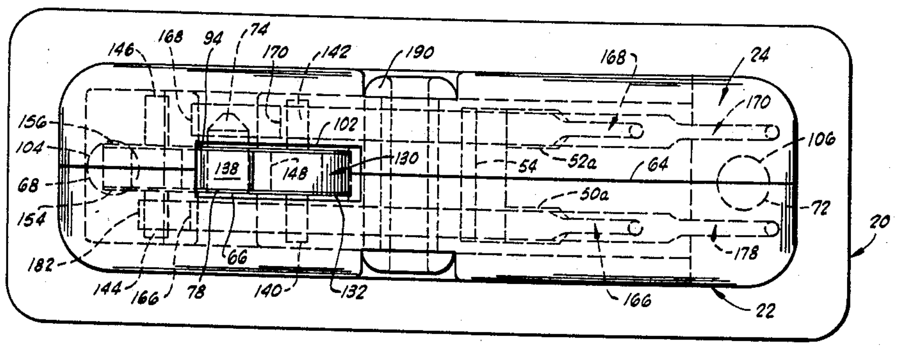
FIG. 2 is a top view of the microswitch of FIG. 1 also showing the interior components in dotted outline.

The composite construction of the microswitch 10 can best be described by a step-by-step assembly of the various parts shown in FIGS. 4 through 15. First a pair of the conductive contact members illustrated in FIG. 14, such as the contact members 166 and 168, are positioned in the base plate member 20 by inserting the lead portions 172 in the apertures 46 and 48, respectively, with the portions 174 lying in the grooves 50 and 52, respectively. The flattened spring contact portions 176 will then extend over the fulcrum 54 generally toward the bore 34. The positions of the contact members 166 and 168 may be seen by reference to the dotted lines of the FIGS. 1 and 2.

After the switch member 130 has been assembled, it is placed against the shoulder 78 of the housing side member 22 with the axle 76 extending through the aperture 134, and with the actuating arm 136 of the switch member extending upwardly and positioned in the slot 66. Next the conductive contact member 178 is positioned with the flattened spring portion 180 in the opening 90 and with the end portion 182 positioned above the contact surface 144 of the switch member, as illustrated in dotted outline in FIG. 1. The conductive contact member 170 is also placed with the flattened spring contact portion 176 in the space 122 of the other housing side member 24. The two housing side members 22 and 24 are then mated by inserting the end of the axle 76 in the well 98 and aligning the half dowels 68 and 104 and the half dowels 72 and 106. Care should be taken as the housing side members 22 and 24 are mated to insure that the contact member 170 is positioned above the contact portion 142 as shown in FIG. 1. A brad 190 may then be inserted through the apertures 92 and 126 to secure the upper edges of the housing side members 22 and 24 together.

Next the mated housing side members 22 and 24 are mated to the base member 20 by inserting the lead portion 184 of the contact member 178 in the bore 38, the lead portion 172 of the contact member 170 in the bore 40, the mated half dowels 72 and 106 in the bore 30, and the mated half dowels 68 and 104 in the bore 34. When the bottom edges 88 and 120 of the mated housing side members 22 and 24 are pressed against the upper surface of the base plate portion 26, the stabilizing portions 174 and 186 will be received in the grooves 44 and 42, respectively, and the edges 89 and 124 will be pressed tightly against the upper surface of the pillow block portion 28 to secure the stabilizing portions 174 and 186 in position. The lower edges 86 and 118 will similarly engage the stabilizing portions 174 of the contact members 166 and 168 to securely hold the contact members in place. A spot of glue may then be placed in the counterbores 32 and 36 to secure the half dowel portions 68 and 104, and 72 and 106 in place.

Figure 3:
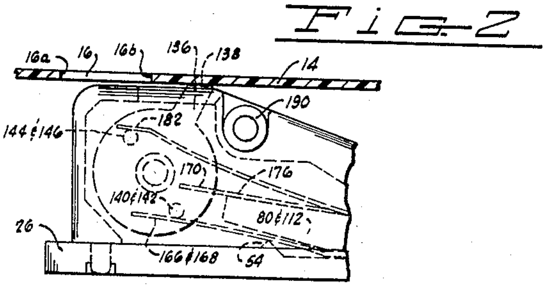
FIG. 3 is a side view of the microswitch of FIG. 1 showing the switch in actuated position.

Several features of construction of the completed microswitch 10 should be noted. For example, the switch member 130 is pivotally supported by the housing support on the axle 76 with the actuating arm portion 136 extending through the elongated slot 66–102. Therefore the switch member 130 is pivotable between two positions as limited by the slot ends *66a–102a* and *66b–102b*. It will also be noted that the tapered end 138 of the actuating arm 136 coincides with the upper surface of the microswitch housing when the actuating arm 136 abuts against the slot end *66b–102b*, as best seen in FIG. 3. The switch member 130 is maintained in centered position on the axle 76 by the shoulder portions 78 and 94. The lower contact members 166 and 168 are securely held in place by the lower edges 86 and 118 of the spacer portions 80 and 112, respectively, and a spot of glue may be added if desired. The flattened spring portions 176 are biased upwardly by the fulcrum portion 54 against the lower faces 84 and 116 of the spacer portions 80 and 112. This arrangement insures that the contact members 166 and 168 do not spring upwardly too high, yet permits the contact members to spring downwardly when engaged by the contact surfaces 140 and 142, as hereafter described in greater detail.

Also as previously mentioned, the stabilizing portions 174 and 186 of the contact members 170 and 178 are retained in position by lower edges 89 and 124 of the enlarged portions 74 and 110 of the peripheral flanges. The flattened portions 176 and 180 are initially bent so as to lie flat against the upper surfaces 82 and 114 of the spacer portions 80 and 112, respectively. However the flattened portion 180 is sprung upwardly and positioned above the contact surface 144 to continually exert a spring bias tending to rotate the switch member 130 in the counter clockwise direction when referring to FIG. 1, to maintain the switch essentially in the position shown in FIG. 1. The contact surface 142 is so positioned on the switch member relative to the actuating arm 136 and the contact surfaces 144 and 146 as to engage the contact member 170 before the actuating arm 136 contacts the ends *66a–102a* of the housing slot, to continually insure contact when the actuating arm 136 is not depressed by the tape 14. It will be noted that the contact member 170 then exerts a clockwise spring bias to the switch member 130 such that equilibrium may in some instances be established before the actuating arm 136 contacts the ends *66a–102a*.

It will also be noted that when the switch member 130 is in the normal spring biased position, i.e., that position shown in FIG. 1, both the contact members 166 and 168 are maintained in spaced relationship from the contact surfaces 140 and 142 by the spacer proper portions 80 and 112.

The general operation of the microswitch 10 can best be understood by a description of the manner in which the microswitch operates in conjunction with the endless magnetic tape device previously referred to. The lead portions 172 and 184 of the four contact members 166, 168, 170 and 178 may be passed through suitable bores 192 in a conventional phenolic printed circuit board 12 and connected by spots of solder 194 to conductive portions 196 of a printed circuit. This is made possible since all leads extend as a group in the same direction from the base plate 26. In the audio playback device, the lead 184 of the spring contact member 178 is connected to ground. The lead portions 172 of the contact members 166 and 168 are connected to the audio amplifier circuit (not shown) and to the endless tape drive capstan motor (not shown), respectively. The contact member 170 is connected to a resistor load circuit (not shown) which provides a dynamic braking circuit for the motor which drives the tape capstan. Assuming that the actuating slot 16 in the endless tape 14 is positioned to receive the actuating arm 136, the pivoted switch member 130 will be in the position shown in FIG. 1 so that both the contact members 166 and 168 will be open and the amplifier and capstan drive motor will be turned off. A circuit will be completed through dynamic braking contact member 170, the contact surface 142, the conductive disk 132, the contact surface 144 and the spring contact member 178 to ground. Therefore the audio device will be off. When an external start switch is momentarily closed to actuate the drive motor and move the endless tape 14 a sufficient distance that the trailing edge *16a* of the actuating slot 16 engages the actuating arm 136 and moves the arm to the second position shown in FIG. 3, the switch member 130 will be pivoted against the bias of the spring contact member 178, and the contact surfaces 140 and 142 will be moved into engagement with the contact members 166 and 168 as illustrated in FIG. 3. This will complete a circuit to the drive motor and to the audio amplifier, and the device will function in a normal manner to reproduce a message recorded on the endless tape.

When the endless tape has played the message through one time and the leading edge *16b* of the actuating slot 16 passes over the actuating arm 136, the spring contact member 178 will snap the switch member 130 back to the position shown in FIG. 1. This instantaneously opens the circuit to the drive motor and to the audio amplifier and simultaneously completes the dynamic braking circuit of the drive motor to very quickly brake rotation of the motor and thereby arrest the travel of the endless tape 14 while the actuating slot 16 is still in register with the actuating arm 136. The audio device will then remain inoperative until such time as the manually actuated switch is closed to move the endless tape 14 a sufficient distance to again depress the switch member 130 to repeat the recorded message as described.

From the above detailed description it will be apparent to those skilled in the art that a novel microswitch has been disclosed which has several highly advantageous features. The microswitch requires only a very small force to move the switch member 130 against the bias of the spring contact member 178 from the normal position shown in FIG. 1 to the actuated position shown in FIG. 3. In this regard, it will be noted that the sensitivity of the microswitch tends to remain generally constant over the entire range of travel of the switch member 130. When the switch member is in the normal position, shown in FIG. 1, the spring contact member 178 exerts a minimum force but acts as a maximum effective lever arm. As the switch member is pivoted to the actuated position of FIG. 3, the effective lever arm of the switch member rapidly decreases, but the force of the spring contact member 178 increases. Also, as the switch member 130 reaches the actuated position of FIG. 3, the contact members 166 and 168 exert a biasing force on the switch member through a relatively short effective lever arm. Therefore the biasing force acting on the switch member 130 tends to remain generally constant, and at a relatively low level, such as about five grams of force. However, the force remains sufficiently great at all times to insure that the switch member will be returned to the normal position upon passage of the slot in the endless tape. In a typical embodiment, the switch member disk 132 may be on the order of $\frac{5}{16}$ of an inch in diameter and the conductive contact members 166, 168, 170 and 178 may be fabricated from silver wire less than 0.020 inch in diameter. Accordingly, the low mass of the switch member permits a very fast return of the switch member 130 from the actuated position of FIG. 3 to the normal position of FIG. 1.

The tapered end 138 of the actuating arm 136 increases the area rubbing against the endless tape 14 and thereby decreases the unit pressure and the rate of wear on the tape. The actuating arm is also wholly depressed into the housing 18 to permit the tape 14, or other actuating mechanism, to pass in close proximity to the housing. The housing 18 not only protects the delicate contact members, but is so designed as to constitute the entire support structure for the various working parts. Still the housing is formed from but three molded parts which are relatively easily assembled. The housing is so constructed as to clamp the contact members securely in position such that the members will function both as electrical contacts and biasing springs as required. The microswitch 10 should normally have an exceedingly long and trouble free operating life and can be manufactured on a mass production basis.

Although a particular embodiment of the microswitch has been described in detail, it is to be understood that various changes, substitutions and alterations in the structure and in the combination of components may be made without departing from the spirit and scope of the invention as defined by the appended claims.

What is claimed is:

1. An electrical switch comprising:

a support;

a switch member pivotally connected to the support for movement about an axis between at least two positions;

said switch member having at least two contact surfaces disposed generally parallel to the axis and a conductive circuit between the two contact surfaces;

a conductive spring contact member connected to the support and engaging one of the contact surfaces for completing a circuit and for continually biasing the switch member to rotate toward one of the positions; and, a second conductive contact member connected to the support for contacting the other of the contact surfaces only when the switch member is in the biased position for completing an electrical circuit through the spring contact member, the conductive circuit and the second conductive contact member.

2. An electrical switch as defined in claim 1 wherein the support comprises:

at least two nonconductive mating housing members and a base member, the members being assembled to form a housing;

an axle extending between two of the housing members;

the switch member being pivotally supported on the axle extending between two of the housing members;

the conductive spring contact member being supported by clamping between one of the housing members and the base member; and, the second conductive contact member being supported by clamping between one of the housing members and a base member.

3. An electrical switch comprising:

a nonconductive support;

a disc-shaped switch member pivotally connected to the support for movement about an axis between at least two positions, the switch member being fabricated of a conductive material and having its faces disposed generally perpendicular to the axis;

an insulating coating on each face;

a pair of conductive contacts connected to the switch member and extending through each side of the insulating coating generally parallel to the axis;

a conductive spring contact member connected to the support and engaging one of the pair of conductive contacts and continually biasing the switch member to rotate toward one of the positions;

a second conductive contact member connected to the support and engaging the other of the pair of contacts when the switch member is in the biased position for completing a circuit through the switch member;

a third conductive contact member connected to the support and engaging the other of the pair of contacts when the switch member is in the position against which it is biased thereby completing a different circuit through the switch member.

4. An electrical switch comprising:

a nonconductive housing comprised of a base member and two mating side members, said side members disposed generally in parallel relationship one to the other and perpendicularly to the base member;

a pivot axle extending between the two side members;

a conductive switch member pivotally supported by the axle for pivotal movement in a plane generally parallel to the side members and perpendicular to the base member, the switch member being pivotable between at least two positions and having an actuating arm extending outside of the housing;

at least two contact surfaces on the switch member disposed generally parallel to the pivot axle;

a spring contact member clamped between two of the housing members and extending into engagement with one of the contact surfaces for continually rotationally biasing the switch member toward one of the positions and for establishing electrical contact therewith; and, a second contact member clamped between two of the housing members and extending into engagement with the other of the contact surfaces when the switch member is held in the position against which it is biased by actuation of said actuating arm for establishing electrical contact therewith to complete an electrical circuit through the contact members and the switch member.

5. An electrical switch comprising:

a nonconductive housing comprised of a base member and two mating side members disposed generally in parallel relationship one to the other and perpendicularly to the base member;

a pivot axle extending between the two side members;

a conductive switch member pivotally supported by the axle for pivotal movement in a plane generally parallel to the side members and perpendicular to the base member, the switch member being pivotable between at least two positions;

at least two contact surfaces on the switch member disposed generally parallel to the pivot axle, the two contact surfaces being disposed on opposite sides of the pivot axle;

an elongated spring contact member clamped between the base member and one of the side members and extending into engagement with one of the contact surfaces for continually rotationally biasing the switch member toward one of the positions and for establishing electrical contact therewith;

second and third elongated contact members each clamped between the base member and one of the side members and extending generally parallel to the spring contact member; and, spacer means formed on one of the housing members for maintaining the second and third contact members separated, the second and third contact members being disposed on opposite sides of said other contact surface such that the second contact member will engage said other contact surface when the switch member is in its biased position and the third contact member will engage said other contact surface when the switch member is in the other position against which it is biased for alternately completing a circuit through the second and third contact members.

6. An electrical switch as defined in claim 3 wherein said disc-shaped switch member has an actuating arm extending outside of the support and is normally held in one position by the spring contact member, said arm being movable to another position upon overcoming the rotational bias.

7. An electrical switch comprising:

a nonconductive housing comprised of a base member and two mating side members disposed generally in parallel relationship one to the other and perpendicularly to the base member;

a pivot axle extending between the two side members;

a conductive switch member pivotally supported by the axle for pivotal movement in a plane generally parallel to the side members and perpendicular to the base member, the switch member being pivotable between at least two positions;

at least two contact surfaces on the switch member disposed parallel to and on opposite sides of the pivot axle, said contact surfaces each extending contact points on each side of the switch member;

an elongated spring contact member clamped between the base member and one of the side members and extending into engagement with a contact point of one of the contact surfaces for continually biasing the switch member toward one of the positions and for establishing electrical contact therewith;

second and third contact members each clamped between the base member and one of the side members and extending generally parallel to the spring contact member for engaging the contact points of the other contact surface when the switch member is in the position against the bias, thereby completing electrical circuits between each of the second and third contact members, the conductive switch member and the spring contact member;

a fourth contact member clamped between the base member and a side member and extending generally parallel to and spaced above the second and third contact members and disposed to engage a contact point of said other contact surface when the switch member is in its biased position thereby completing the electrical circuit between the fourth contact member, the conductive switch member and the spring contact member.

References Cited by the Examiner

UNITED STATES PATENTS

| | | | |
|---|---|---|---|
| 2,623,958 | 12/52 | Loge | 200—1 |
| 2,723,327 | 11/55 | Gilbert | 200—166 |

BERNARD A. GILHEANY, *Primary Examiner.*

ROBERT K. SCHAEFER, *Examiner.*